United States Patent [19]

Hals

[11] Patent Number: 5,138,900
[45] Date of Patent: Aug. 18, 1992

[54] ADJUSTABLE HANDLEBAR STEM FOR A BICYCLE OR SIMILAR VEHICLE

[76] Inventor: Cato Hals, Smedgt. 33 B, 0651 Oslo 6, Norway

[21] Appl. No.: 669,398
[22] PCT Filed: Sep. 19, 1989
[86] PCT No.: PCT/NO89/00096
§ 371 Date: Apr. 9, 1991
§ 102(e) Date: Apr. 9, 1991
[87] PCT Pub. No.: WO90/03302
PCT Pub. Date: Apr. 5, 1990

[30] Foreign Application Priority Data

Sep. 20, 1988 [NO] Norway .................. 884179

[51] Int. Cl.⁵ .............................. G05G 1/14
[52] U.S. Cl. ........................ 74/551.7; 74/551.1; 74/551.3
[58] Field of Search ............ 74/551.1, 551.3, 551.4, 74/551.6, 551.7

[56] References Cited

U.S. PATENT DOCUMENTS 575,936   1/1897   Roso .......................... 74/551.3 X
4,896,559 1/1990   Marier et al. ............... 74/551.3 X

FOREIGN PATENT DOCUMENTS 1003619   2/1957   Fed. Rep. of Germany .... 74/551.3
867249   10/1941   France ....................... 74/551.3
90/03302  4/1990   PCT Int'l Appl. ........... 74/551.3
10337    of 1896   United Kingdom ......... 74/551.7

Primary Examiner—Richard Lorence
Assistant Examiner—William C. Trousdell
Attorney, Agent, or Firm—Wenderoth, Lind & Ponack

[57] ABSTRACT

An adjustable and lockable handlebar stem includes a post to be clamped in a forward frame tube of a bicycle, one upper arm and one lower arm pivotably supported at first bearing points on the post, and a handlebar mounting member with a through hole for accommodating a handlebar. The handlebar mounting member is pivotably supported by the two arms at second bearing points. The arms can be locked together, for example by means of a stud in a slide groove. Due to unequal distances between the first bearing points and the second bearing points, there is achieved an ergonometrically favorable rotation of the handlebar itself when the position of the complete mechanically movable unit is changed.

19 Claims, 4 Drawing Sheets

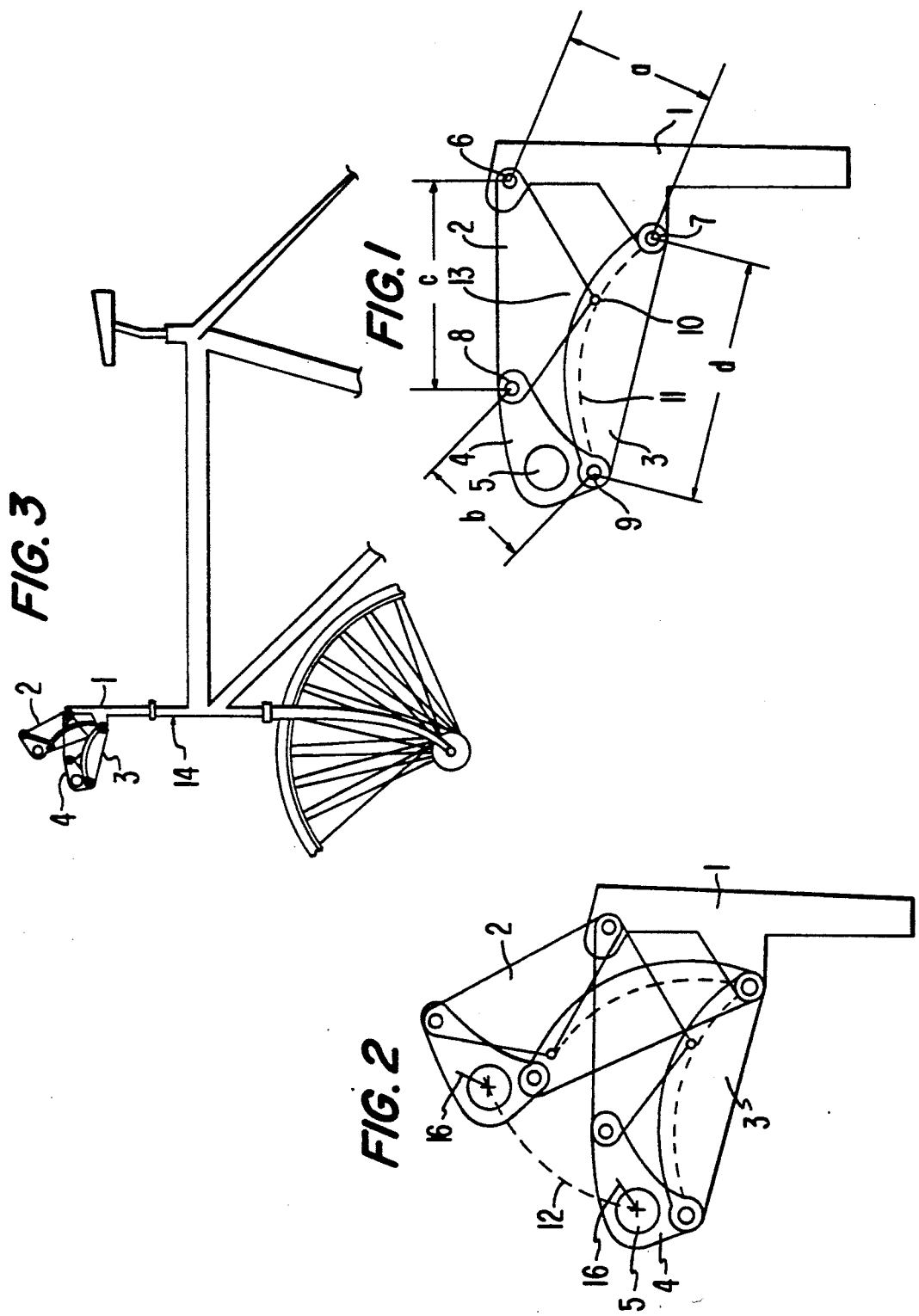

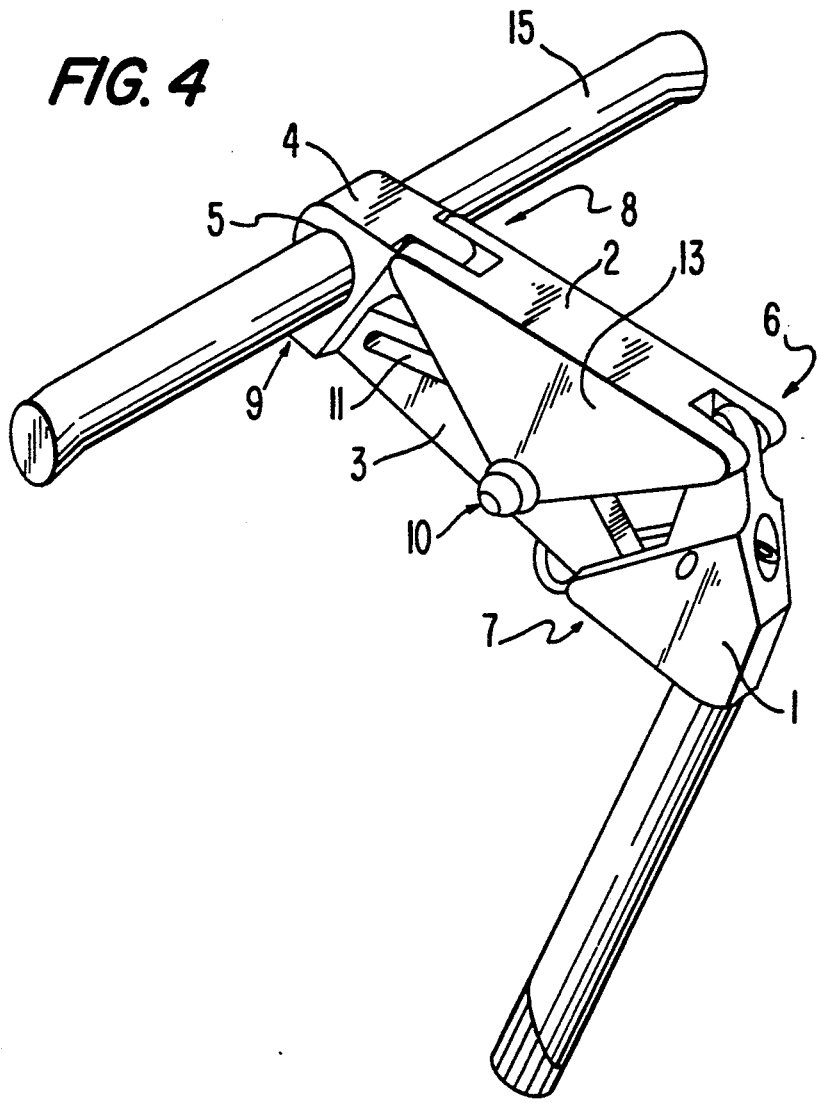

ADJUSTABLE HANDLEBAR STEM FOR A BICYCLE OR SIMILAR VEHICLE

BACKGROUND OF THE INVENTION

The present invention relates to an adjustable handlebar stem for bicycles, mopeds, motorcycles and all steerable devices which utilize a steering principle similar to that of a bicycle. More specifically, the invention relates to a simultaneous handlebar height and forward/backward position joint adjustment means which can be locked.

Previously, a bicycle has usually been equipped with a handlebar stem which has only the possibility of straight up and down adjustments. However, special adjustable handlebar stem devices of various types are previously known and are adapted for various purposes. Recently however, some handlebar stem manufacturers have in addition made it possible to vary the length of protrusion of a handlebar stem. The result is that the handlebar may be placed in almost any position. When the position of the handlebar is to be varied, the handlebar itself must also be rotated in order that the brake handles fall into the hands of a rider in a natural and ergonometrically correct manner. In order to adjust the handlebar with the previously known handlebar stem devices, it is necessary first to loosen three bolts, thereafter to move the handle bar into the desired position, and then to refasten the same three bolts. The three bolts have the following respective purposes: a) adjustment of the bicycle handlebar up and down, b) adjustment of protrusion in directions toward or away from the bicyclist, and c) rotation of the handlebar itself around the handlebar main axis.

From Belgian Patent No. 523,314 is previously known a device having certain qualities in common with the present invention, namely an adjustable device using two parallel arms movable about bearing points and which can be locked in a stepless manner by means of a wing nut in one of the bearing points in order to provide a handlebar adjustment substantially in height. The travel of the handlebar is from an upper extreme position, downward and forward, and thereafter further downward and backward again to a lower extreme position. Such parallelogram guiding of the handlebar maintains the handlebar orientation in a vertical plane, i.e. the rotational orientation of the handlebar around the handlebar main axis is maintained through the entire movement of the handlebar.

For quite some time the possibility of varying the body posture during cycling has been considered desirable. In other words, there has been a need for a simple and practical device on the bicycle for providing such a possibility. In the first place it is uncomfortable to sit in the same position for a long time while cycling. Secondly, by varying the sitting posture on the bicycle, more effective cycling is achieved. When bicycling uphill, or possible when bicycling at a higher speed on the flat, it is often found more efficient for the handlebar to be in a low and relatively far advanced position. However, when bicycling in dense traffic where a good view is necessary, it is often found most appropriate to sit in a relatively high and upright posture.

SUMMARY OF THE INVENTION

With a handlebar stem in accordance with the present invention, a lockable adjustment of the handlebar position is achieved in a simple manner, possibly while cycling and without the use of tools, and particularly ergonometrically correct and consequently wholesome and comfortable possibilities of variation of the sitting posture of the cyclist are achieved.

This object is achieved by putting into use a type of handlebar stem. In a preferred embodiment of an adjustable handlebar stem in accordance with the invention, it is possible to vary the handlebar position along a curve over and in front of a frame of the bicycle. The curve runs from a position up and close to the bicyclist to a position which is down and further away from the bicyclist. In accordance with the invention the adjustable handlebar stem is moved merely by loosening a single clamping device. After changing the handlebar position, the handlebar is clamped in a new position by relocking the clamping device. During movement of the handlebar from one position to another, the adjustable handlebar stem in accordance with the invention itself will provide rotation of the handlebar.

BRIEF DESCRIPTION OF THE DRAWINGS

The invention will be more clearly understood from the following description of a non-limiting embodiment, and also with reference to the accompanying drawings, wherein:

FIG. 1 is a side view of an embodiment of a handlebar stem in accordance with the invention;

FIG. 2 is a similar view showing travel of movable parts of the handlebar stem of FIG. 1;

FIG. 3 is an elevation view showing the handlebar stem in two positions on a bicycle;

FIG. 4 is a perspective view of the handlebar stem;

DETAILED DESCRIPTION OF THE INVENTION

Figure 5:
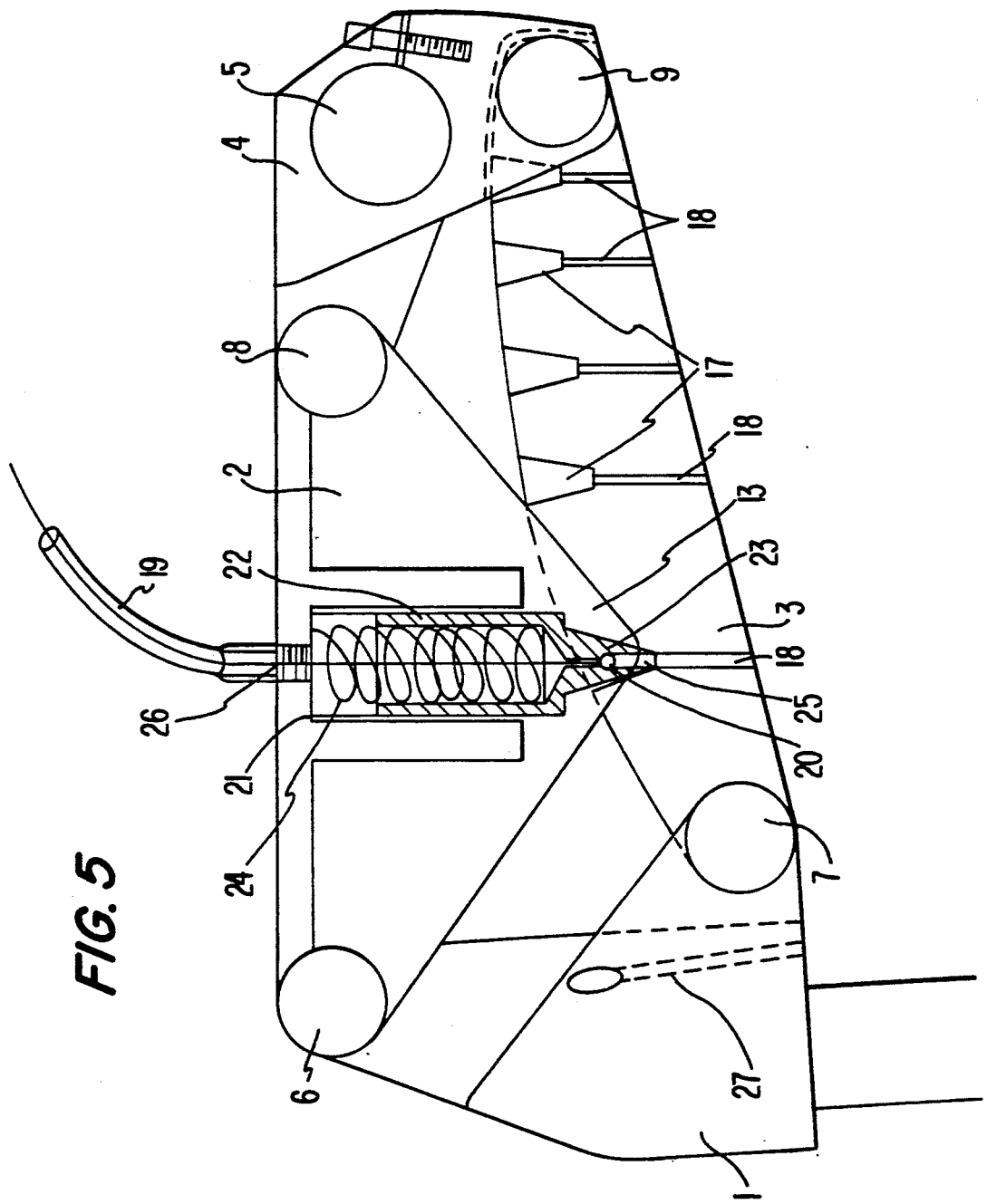
FIG. 5 is a side view of an embodiment of a handlebar stem in accordance with, the invention and comprising a locking means for fixed positions.

In FIG. 1 is illustrated an example of a handlebar stem in accordance with the invention. In the preferred embodiment the handlebar itself will be located in from of a handlebar stem post 1 that extends down into a forward bicycle frame tube 14 (see FIG. 3) and clamped. A handlebar 15 (see FIG. 4) is clamped in a hole 5 in a handlebar mounting member 4 in a per se well known manner, however this is shown only in FIG. 4.

An upper arm 2 and a lower profile 3 are pivotably supported at opposite ends thereof at respective bearing points 6, 7, 8 and 9. Thus, it is possible to move the arms 2, 3 around the bearing points 6 and 7, in opposite directions until outer or extreme positions thereof are reached where the geometry or the construction thereof prevents further movement. The complete movable mechanism thus consists of four parts, where post 1 is in a fixed position when mounted on the bicycle. The two arms 2, 3 are both pivotably supported both at the handlebar mounting member 4 and at post 1, so that arms 2, 3 can rotate independently of each other around their two respective pairs of axes.

In the illustrated embodiment, a stud 10 on a protruding portion 13 on the upper arm 2 provides, in combination with a groove 11 in the lower arm 3, a locking means operable in such a manner that the two arms 2 and 3 can be locked together in selectable positions between and out to two outer positions, an upper outer position being shown in FIG. 2. It furthermore is shown in FIG. 2 that the mechanism can be moved by a small distance further down/forward before reaching a lower outer position.

The particular feature of the handlebar stem in accordance with the invention is that a distance a between the two bearing points 6 and 7, as shown in FIG. 1, is not equal to a distance b between bearing points 8 and 9 on the handlebar supporting member 4. In a preferred embodiment shown in FIG. 1, a is larger than b. This fact ensures that when rotating from an upper position of the movable parts down to a lower position thereof, the handlebar 15, being clamped in the hole 5, will rotate in a direction opposite to such direction of rotation. This fact provides the correct ergonometric conditions when considering hand gripping ordinary brake handles fixedly mounted on the handlebar 15. In the upper position (see FIG. 2) it is natural for the brake handles to point in slanted downward directions corresponding to an upright body posture. However, when it is desired to lower the handlebar in a forward direction and take a more efficient bicycling posture, the elbows are lowered at the same time, and the brake handle grips naturally will be inclined more horizontally. The movement of the handlebar stem in accordance with the present invention provides exactly such an effect. In FIG. 2 this rotation effect is tentatively displayed in a clear manner by showing a purely illustrative indicator mark or line 16 which rotates in a clockwise direction when the handlebar is lowered in a counter-clockwise movement from the upper position above and downwardly and toward the left to the lower position.

By providing an appropriate design of the arms 2 and 3, a simple and effective locking method is also achieved. For example, arm 3 is equipped with groove 11, and stud 10 on the protruding part 13 of profile arm 2 makes it possible in the illustrated embodiment to clamp the protruding part 13 solidly to the lower arm 3 in any of a number of possible positions.

Providing such simple and effective locking or clamping means, which also may be operated while riding, is of course possible by means of ordinarily known techniques. One example of such a per se known locking device, well known from bicycle racing, is a wheel hub quick-clamp mechanism, and such a clamping device is both simple in use and sufficiently strong. It is also possible to operate the locking means from a handle on the handlebar 15 itself.

Furthermore, it is possible to use other different types of locking means for clamping the two arms 2 and 3 solidly against each other, apart from the example shown in the drawings and providing a possibility for locking in any position between the two end positions.

The arms may be constructed with different types of designs, and the bearing points 6, 7, 8 and 9 can be located in different manners in relation to each other, so that various different suitable curves 12 of travel (see FIG. 2) of the handlebar 15 are achieved. By locating the bearing points appropriately, the swing of the handlebar movement as well as the rotation of the handlebar during movement may be varied. As previously mentioned, such variations are achieved by moving the bearing points when constructing the stem, or by increasing their mutual spacings.

Thus, a most suitable and favorable type of construction is achieved by making a distance c between the upper bearing points 6 and 8 (see FIG. 1) shorter than a distance d between the corresponding lower bearing points 7 and 9. Thereby it is possible to ensure that the movement of the arms or possibly the handlebar mounting member 4 takes place substantially above a horizontal plane passing through pivot support point 7.

Since due to ergonometric considerations it is not suitable for the handlebar to moves backwards when moving downward, bearing point spacings as well as remaining material design are preferably chosen in such a manner that the lower outer position of the movement of the arms at the same time constitutes a maximum forward protruding position of the handlebar.

Furthermore, it should be noted that the four-part construction of the preferred embodiment has the particular feature that arms 2 and 3 are pivotably supported directly on the handlebar mounting member 4, so that the movable mechanism constituted by handlebar mounting member 4, arms 2 and 3 and post 1 is an integrated and strong unit. This contrasts to the previously known solution of the most closely related type wherein a known parallelogram guiding system provides separate clamps gripping around additional posts at each end. Thus, the construction of the present invention provides advantages also when considering construction strength.

As previously mentioned, it is possible to use various types of locking mechanism. In FIG. 5 is shown a possibility with fixed locking positions. The lower arm 3 is equipped in its top surface with recesses 17 each having a substantially truncated wedge shape or conical shape, and from the bottom of each recess 17 a thin hole 18 is drilled right down to the underside of arm 3 for leading a pulling wire 19 with an end ball 20 for an eventual change of wire. In the upper arm 2 is formed an internal, downwardly directed bore 21 in which is located a slidable plunger 22. A lower end 23 of plunger 22 has a shape which is complementary to the shape of recess 17, so that the lower end 23 can enter one of the recesses 17 with a tight fit. A strong spiral spring 24 placed in the bore 21 urges the plunger 22 downwardly into solid engagement with a selected recess 17.

In order to hoist the plunger 22 for a change of position, there is arranged in the lower conical or wedge-shaped end 23 an aperture 25 aligned with hole 18 and with the same diameter. Aperture 25 has a narrowed portion some distance up inside end 23, in such a manner that a shoulder is formed for engagement by the end ball 20 on wire 19. The continuation of the aperture in the upward direction has a diameter such that only the wire 19 itself can pass therethrough. Wire 19 continues in an upward direction centrally through plunger 22 and bore 21 and further through a nipple 26 on the top side of the upper arm 2, and extends therefrom as a central wire of a Bowden cable.

By pulling a not shown handle at the other end of such Bowden cable, plunger 22 can thus be hoisted out and up from the particular recess 17, against the force of spring 24. When plunger 22 has been hoisted clear of the top side of lower arm 3, the bicyclist may move the handlebar 15 (FIG. 4) rapidly into one of the other fixed positions, plunger 22 sliding on the top side of lower arm 3 and moving down into the closest recess 17 in accordance with the motion, if the Bowden cable is released prior to having reached the desired position.

As shown in FIG. 5, the handlebar stem post 1 may suitably be equipped with a hole 27 for passage therethrough of a front wheel brake wire.

Figure 6:
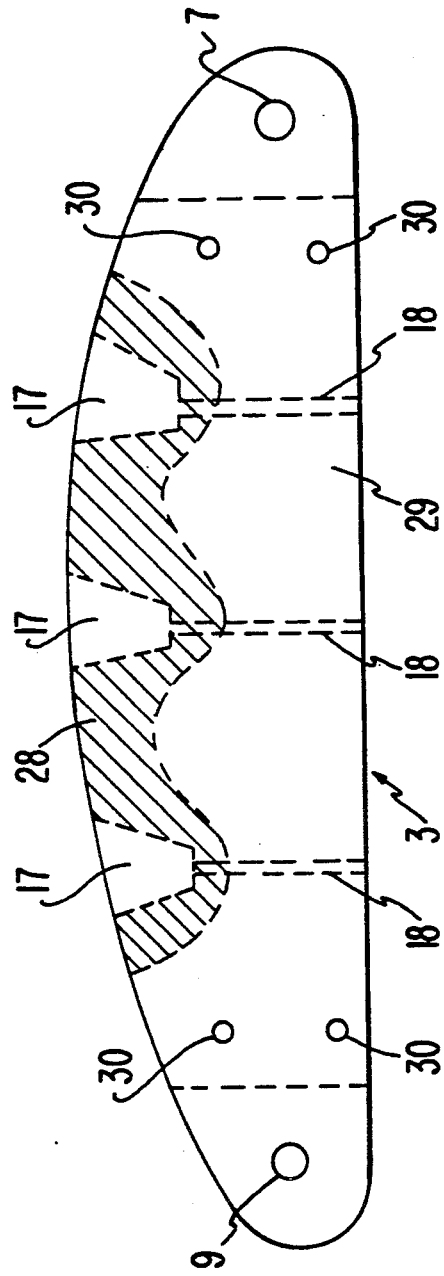
FIG. 6 is an elevation view of an embodiment with a springing device.

In order to achieve the further effect that the handlebar stem provides a favorable spring action, which may be of special interest when bicycling on a very rough (road) surface, the lower arm 3 of the previous embodiment having the fixed locking positions may be equipped with a portion 28 or 29 of elastic material, for example hard rubber, see FIG. 6.

In FIG. 6, lower arm 3 is shown in an embodiment with only three recesses 17. One possibility is that a smaller portion 28 adjacent such recesses is made of hard rubber. Fixing screws 30 enable an entire inner central section 29 to be removed from inside a strong outer metal frame of lower arm 3. When using an elastic material for portion 28, a certain degree of wear must be counted on, so that the central section 29 must be changed after having been used for some time. Possibly the entire central section 29 (inside a strong outer metal frame) may consist of hard rubber and may be removable in the same manner as described above.

Suitably the plunger 22 should also be removable in a simple manner from the top side of upper arm 2. For example, the entire bore section may be removable from the top side by screwing. Also, the possibility of removing the recess part in lower arm 3 in connection with the resilient embodiment may be utilized for a non-resilient embodiment, i.e. a central part of lower arm 3 which includes the recesses 17 may generally be arranged in a removable manner.

I claim:

1. An adjustable handlebar stem for a bicycle or a similar vehicle, said stem comprising:

a post to be clamped in a forward frame tube of the vehicle;

upper and lower arms pivotally mounted at first ends thereof to said post about respective upper and lower first bearings having parallel pivot axes that extend horizontally in a normal standing position of the vehicle;

a handlebar mounting member having opposite ends pivotally mounted relative to second ends of said upper and lower arms about respective upper and lower second bearings having parallel pivot axes extending parallel to said pivot axes of said first bearings, said handlebar mounting member having therethrough a horizontal hole for clampingly receiving a handlebar, said hole having an axis extending parallel to said bearing axes;

said upper and lower arms and said handlebar mounting member defining a movable system that is movable relative to said post about said first bearings between upper and lower extreme end positions;

locking means for locking said movable system at a desired position corresponding to either of said extreme end positions or at selected positions therebetween; and a first distance between said upper and lower first bearings being different from a second distance between said upper and lower second bearings, whereby during movement of said movable system between said upper and lower extreme end positions thereof the rotational orientation of said handlebar mounting member relative to said axis of said hole is variable.

2. A stem as claimed in claim 1, wherein said first distance is greater than said second distance.

3. A stem as claimed in claim 2, wherein said second bearings are positioned forwardly of said first bearings relative to a direction of riding movement of the vehicle.

4. A stem as claimed in claim 2, wherein a third distance between said upper first bearing and said upper second bearing is less than a fourth distance between said lower first bearing and said lower second bearing.

5. A stem as claimed in claim 4, wherein the movement of said movable system between said upper and lower extreme end positions thereof takes place substantially above a horizontal plane passing through said pivot axis of said lower first bearing.

6. A stem as claimed in claim 1, wherein one of said arms has therein a guide groove, and the other of said arms includes a protruding portion having a stud extending into said groove.

7. A stem as claimed in claim 6, wherein said locking means is provided on said protruding portion and said stud and said stud is lockable at selected positions in said groove.

8. A stem as claimed in claim 7, wherein said locking means is operable during operation of the vehicle.

9. A stem as claimed in claim 8, wherein said locking means comprises a quick-release clamping mechanism.

10. A stem as claimed in claim 1, wherein said locking means comprises a plurality of recesses formed in a top surface of said lower arm, a plunger mounted on said upper arm, spring means for urging said plunger downwardly to a locked position into a selected one of said recesses, and means for moving said plunger against the force of said spring means to release said plunger from said recess.

11. A stem as claimed in claim 10, wherein said plunger has a lower end shaped complementarily to said recesses.

12. A stem as claimed in claim 11, wherein said recesses have a truncated wedge shape.

13. A stem as claimed in claim 11, wherein said recesses have a truncated conical shape.

14. A stem as claimed in claim 10, wherein said plunger is slidably received in a bore in said upper arm.

15. A stem as claimed din claim 10, wherein said moving means comprises a pull-wire extending through said plunger.

16. A stem as claimed in claim 10, wherein a portion of said lower arm defining said recesses is formed of a relatively hard elastic material.

17. A stem as claimed in claim 1, wherein said locking means is operable by a handle to be mounted on the handlebar.

18. A stem as claimed in claim 1, wherein said movable system has a construction such that said hole is located at a maximum forward position at said lower extreme end position of said movable system.

19. A stem as claimed in claim 1, wherein said second ends of said upper and lower arms are directly pivoted to said opposite ends of said handlebar mounting member.

* * * * *